Dec. 2, 1958 D. N. MacDONALD 2,862,675

PERFORATED TAPE TRANSPORT SYSTEM

Filed May 14, 1956

INVENTOR.
DUNCAN N. MACDONALD
BY
Christie, Parker & Hale
ATTORNEYS

United States Patent Office 2,862,675

Patented Dec. 2, 1958

2,862,675

PERFORATED TAPE TRANSPORT SYSTEM

Duncan N. MacDonald, Arcadia, Calif., assignor, by mesne assignments, to Burroughs Corporation, Detroit, Mich., a corporation of Michigan Application May 14, 1956, Serial No. 584,602

3 Claims. (Cl. 242—55.12)

This invention relates to tape transport systems, and more particularly, is concerned with a slack loop control system for perforated tapes.

Where a strip of material of substantial length is to be transported past an operational station, it is necessary to control the rate at which the strip is supplied to the operational station and the rate at which the strip is taken from the operational station. For example, in magnetic tape recording systems, a strip of magnetized tape is fed from a supply reel to a take-up reel via an operational zone in which are located magnetic recording and reading heads.

For some uses, such as memory systems and digital computers, it is necessary to scan quickly the length of the magnetic tape to derive selected information recorded at a particular location. This means that the apparatus for transporting the tape must be quickly responsive to rapid acceleration and deceleration, and be capable of quickly reversing the direction of the tape. Due to the inertia of the reeling system, such accelerations and decelerations are apt to break the tape. For this reason it has been proposed that slack loops be interposed between the supply reel and the operational zone, and between the operational zone and the take-up reel. By this means, the direction of tape transport, or the rate at which the tape is passing the operational zone, may be quickly changed with a corresponding change by the supply and take-up reels taking place at a slower rate.

Where slack loops are employed in a tape transport system, some means must be provided for controlling the rate at which the supply reel unwinds the tape, and the rate at which the take-up reel winds the tape, to keep the slack loop at an optimum length. One known method which has been successfully employed is to hold each of the slack loops in position in a separate vacuum column which is evacuated below the tape. Various methods for sensing the length of the slack loop and controlling the reels have been employed, such as taught in the co-pending application Serial No. 430,334, filed May 17, 1954, in the names of Arvo A. Lahti et al.

While the use of vacuum columns to provide slack loop control in magnetic tape systems has proved to be a successful technique, it has heretofore been impractical in systems utilizing perforated tape as the information storage medium. Since the vacuum column depends upon the action of the tape as a piston within the column to establish a differential pressure on either side of the tape loop within the column, it is evident that perforations in the tape make it impossible to maintain the necessary pressure differential.

This difficulty is overcome in the present invention by providing means to close off the openings in the tape formed by the perforations where the tape is looped in the vacuum column. To this end a thin cylindrical ring is provided having a width and a diameter which are slightly less than the respective cross-sectional dimensions of the rectangular duct forming the vacuum column in which the tape loop is inserted from one end. This cylindrical ring is positioned in and supported by the loop or bight portion of the tape so as to close off the perforations in the tape and maintain a pressure differential across the loop within the vacuum column.

For a better understanding of the invention reference should be had to the accompanying drawings, wherein.

Figure 1:
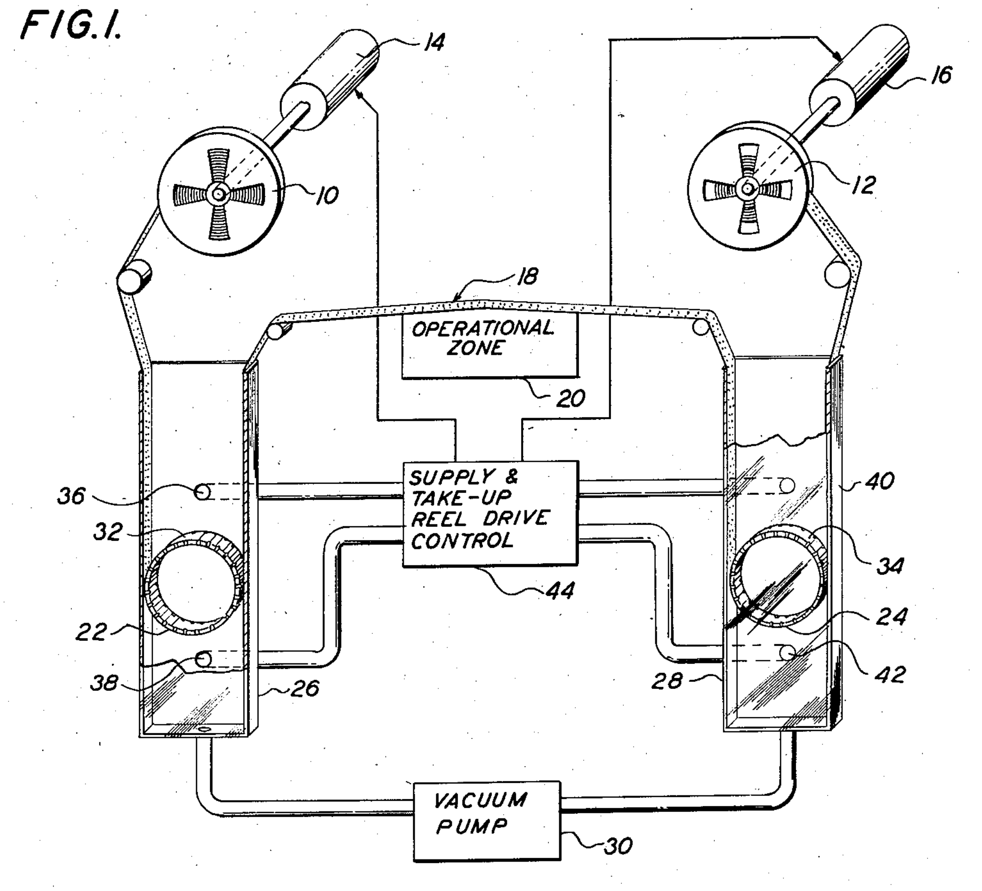
Fig. 1 is a simplified perspective view of a tape transport system incorporating the features of the present invention.

Referring to Fig. 1, apparatus is shown for transporting perforated tape from one reel to another reel, as from a supply reel 10 to a take-up reel 12 driven respectively by a supply drive motor 14 and a take-up drive motor 16. The tape is driven through an operational zone 20 where information is derived in response to the pattern of the perforations in the tape. The operational zone includes means for driving the tape at a constant linear speed in either direction, the purpose of the drive motors 14 and 16 being to supply and take up tape as is required by movement of the tape through the operational zone. Slack loops 22 and 24 are provided in the tape on either side of the operational zone 20 to take up slack and maintain tension in the tape regardless of deceleration and acceleration of the tape, such as occurs with reversal of direction of the tape through the operational zone.

The slack loops 22 and 24 are positioned respectively in vacuum columns 26 and 28 of rectangular cross-section, the narrow cross-sectional dimension of the vacuum columns being substantially equal to the width of the tape. A vacuum is produced in the lower portion of the vacuum columns by means of a vacuum pump 30 connected to the bottom end of the respective vacuum columns. Normally the perforations in the tape would cause excessive leakage past the loops 22 and 24, preventing any substantial pressure differential across the tape within the vacuum columns. In accordance with the present invention this problem is eliminated by the provision of a pair of cylindrical rings 32 and 34 positioned within the vacuum columns and supported by the bight portion of the tape loops 22 and 24. The cylindrical rings have a diameter slightly less than the larger cross-sectional dimension of the columns and an axial width slightly less than the narrow dimension of the vacuum columns. The rings are preferably made of very thin metal or a lightweight plastic to reduce the inertia effect in up and down movement of the loops within the columns. The rings may be permitted to rotate as the tape is fed through the operational zone, although it is not necessary that they do rotate. For that reason, although cylindrical rings have been shown, it will be understood that different shaped elements, such as a U-shaped element, may be utilized as well as a closed ring to close off the holes in the bight portion of the slack loop.

Figure 2:
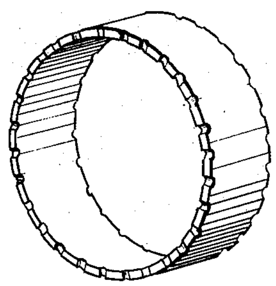
Fig. 2 is an enlarged perspective view of the tape ring.

As best seen in Fig. 2, the edges of the rings are preferably serrated so that the region within the cylindrical rings is substantially open to atmospheric pressure. This is particularly desirable where the slack loop in the perforated tape is used in conjunction with a slack loop control system as described in the above-identified co-pending application Serial No. 430,334. In such a system pressure sensor means, such as indicated at 36, 38, 40 and 42, is provided in the vacuum columns, the pressure sensor means being connected to a supply and take-up reel drive control 44 by means of which the drive motors 14 and 16 are regulated to maintain the length of the loops 22 and 24 within predetermined limits. It is desirable in such a system that the upper sensor means 36 and 40 in the respective vacuum columns be maintained at ambient pressure except when the loops 22 and 24 rise above the position of the sensor means. For this reason, it is desirable that ambient pressure be maintained within the cylindrical rings.

Figure 3:
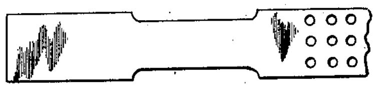
Fig. 3 is an enlarged view of one end of the tape.

The serrations in the edges of the rings also provide the means for sensing the end of the tape. Thus the tape may be reduced in width adjacent the ends, as shown in Fig. 3. This permits leakage of air by the tape into the lower region of the vacuum column. Suitable pressure sensitive means (not shown), located in the bottom of the vacuum column may be made to respond to the sudden rise in the pressure within the vacuum column to cause reversal of the direction of the tape through the operational zone.

From the above description it will be seen that the addition of the cylindrical rings above thee slack loops within the vacuum columns provides a simple yet highly satisfactory way of converting the tape transport system of the type described in the above-identified co-pending application involving vacuum operated slack loop control to operation with perforated tape. Where otherwise the perforated tape would not seal off the vacuum column as required for proper operation, the addition of the cylindrical rings seals off the openings in the tape and permits operation in the same manner as heretofore achieved with magnetic tape, without any further modification of the tape transport system.

I claim:

1. Apparatus for providing slack loop control in a perforated tape transfer system, said apparatus comprising a hollow duct of rectangular cross-section, one cross-sectional dimension being substantially equal to the width of the perforated tape, the tape extending into and out of one end of the duct, whereby a bight portion is formed in the tape within the duct, a hollow cylindrical ring having a width slightly less than said one cross-sectional dimension of the duct and an outer diameter slightly less than the other cross-sectional dimension of the duct, the ring being positioned in and supported by the bight portion of the tape within the duct, and means for establishing a partial vacuum in the duct on the opposite side of the tape from the hollow ring, the ring having serrated edges to insure an ambient air pressure condition within the hollow ring.

2. Apparatus for providing slack loop control in a perforated tape transfer system, said apparatus comprising a hollow duct of rectangular cross-section, one cross-sectional dimension being substantially equal to the width of the perforated tape, the tape extending into and out of one end of the duct, whereby a bight portion is formed in the tape within the duct, a hollow cylindrical ring having a width slightly less than said one cross-sectional dimension of the duct and an outer diameter slightly less than the other cross-sectional dimension of the duct, the ring being positioned in and supported by the bight portion of the tape within the duct, and means for establishing a partial vacuum in the duct on the opposite side of the tape from the hollow ring.

3. Apparatus for providing slack loop control in a perforated tape transfer system, said apparatus comprising a hollow duct of rectangular cross-section, one cross-sectional dimension being substantially equal to the width of the perforated tape, the tape extending into and out of one end of the duct, whereby a bight portion is formed in the tape within the duct, means for closing off the perforations in the bight portion of the tape including an element positioned in and supported by the bight portion of tape, said element having a curved surface in contact with the tape, the curved surface of the element having a projected area of slightly lesser dimensions than the cross-sectional area of the duct, and means for establishing a partial vacuum in the duct on the opposite side of the tape from said element.

References Cited in the file of this patent

FOREIGN PATENTS 1,085,854 France ---------------- Aug. 4, 1954